US011228639B2

(12) United States Patent
Cameron

(10) Patent No.: US 11,228,639 B2
(45) Date of Patent: Jan. 18, 2022

(54) SERVICE CORRELATION ACROSS HYBRID CLOUD ARCHITECTURE TO SUPPORT CONTAINER HYBRIDIZATION

(71) Applicant: AT&T Intellectual Property I, L.P., Atlanta, GA (US)

(72) Inventor: Amanda Cameron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 82 days.

(21) Appl. No.: 16/860,272

(22) Filed: Apr. 28, 2020

(65) Prior Publication Data

US 2021/0337014 A1 Oct. 28, 2021

(51) Int. Cl.
*H04L 29/08* (2006.01)
*G06F 9/50* (2006.01)
*H04L 29/06* (2006.01)
*H04L 12/24* (2006.01)
*H04L 12/715* (2013.01)
*G06F 9/455* (2018.01)

(52) U.S. Cl.
CPC .......... *H04L 67/10* (2013.01); *G06F 9/45558* (2013.01); *G06F 9/5072* (2013.01); *H04L 41/5096* (2013.01); *H04L 45/64* (2013.01); *H04L 63/20* (2013.01)

(58) Field of Classification Search
CPC ..... H04L 67/10; H04L 45/64; H04L 41/5096; H04L 63/20; G06F 9/5072; G06F 9/45558
See application file for complete search history.

(56) References Cited

U.S. PATENT DOCUMENTS

| 10,404,474 | B1* | 9/2019 | Caceres | H04L 9/3263 |
|---|---|---|---|---|
| 10,877,739 | B1* | 12/2020 | Fernandez | G06F 8/63 |
| 2010/0306765 | A1* | 12/2010 | DeHaan | H04L 12/6418 |
| | | | | 718/1 |
| 2019/0266534 | A1* | 8/2019 | Kessaci | G06F 9/45558 |
| 2020/0304526 | A1* | 9/2020 | Abraham | G06F 9/455 |
| 2020/0358744 | A1* | 11/2020 | Lee | H04L 63/0236 |
| 2020/0412769 | A1* | 12/2020 | Yi | H04L 63/0853 |

\* cited by examiner

*Primary Examiner* — Michael A Keller
(74) *Attorney, Agent, or Firm* — Hartman & Citrin LLC

(57) ABSTRACT

Concepts and technologies disclosed herein are directed to service correlation across hybrid cloud architecture to support container hybridization. According to one aspect of the concepts and technologies disclosed herein, an overlay network can instantiate a message bus between a first cloud network and a second cloud network. The overlay network can receive, via the message bus, a request from the second cloud network for a container image stored in a containerized application asset repository of the first cloud network. The overlay network can retrieve, via the message bus, the container image from the containerized application asset repository. The overlay network can provide, via the message bus, the container image to the second cloud network for creating a container based upon the container image.

18 Claims, 14 Drawing Sheets

SERVICE CORRELATION ACROSS HYBRID CLOUD ARCHITECTURE TO SUPPORT CONTAINER HYBRIDIZATION

BACKGROUND

Cloud computing allows dynamically scalable virtualized resources to host applications and services. Cloud computing assures an appropriate level of resources are available to power software applications when and where the resources are needed in response to demand. As a result, cloud computing allows entities to respond quickly, efficiently, and in an automated fashion to rapidly changing business environments.

In vendor-hosted clouds, Infrastructure-as-a-Service ("IaaS") and Platform-as-a-Service ("PaaS") services are now being offered to clients like AT&T. These are a new class of resources available for use in cloud environments compared to datacenter compute and infrastructure in a legacy internal cloud. These new resources are highly ephemeral, often having a total lifespan measured in minutes as opposed to days, weeks, or even years in a legacy environment. Due to the short-lived nature of resources in vendor-hosted cloud, it becomes difficult correlating vulnerabilities to internal business units in an automated downstream way. Additionally, from a strategic architecture perspective, when migrating workloads to a public cloud, there is an opportunity to break the chains of legacy inventory models and to push all asset data completely to the cloud service provider in a satellite model. For larger companies, this is more challenging because legacy processes are dependent upon legacy inventory.

SUMMARY

Concepts and technologies disclosed herein are directed to service correlation across hybrid cloud architecture to support container hybridization. According to one aspect of the concepts and technologies disclosed herein, an overlay network can instantiate a message bus between a first cloud network and a second cloud network. In some embodiments, the first cloud network can be or can include a private cloud network, and the second cloud network can be or can include a public cloud network. The private cloud network and the public cloud network can be owned by different entities. In some other embodiments, the first cloud network can be or can include a first private cloud network, and the second cloud network can be or can include a second private cloud network. In these embodiments, the first private cloud network and the second private cloud network can be owned by the same entity. The overlay network can receive, via the message bus, a request from the second cloud network for a container image stored in a containerized application asset repository of the first cloud network. The overlay network can retrieve, via the message bus, the container image from the containerized application asset repository. The overlay network can provide, via the message bus, the container image to the second cloud network for creating a container based upon the container image.

In some embodiments, the overlay network can be or can include a software-defined network ("SDN"). The SDN can include a plurality of SDN elements and an SDN controller. In these embodiments, the SDN controller can instantiate the message bus as one of the plurality of SDN elements.

In some embodiments, the overlay network can instantiate a dedicated message bus interface on the message bus. In these embodiments, the overlay network can provide the container image to the second cloud network for creating the container based upon the container image via the dedicated message bus interface.

In some embodiments, the overlay network can receive, via the message bus, a second request from the second cloud network for a second container image. The overlay network can, in response, retrieve, via the message bus, the second container image from the containerized application asset repository. The overlay network can provide, via the message bus, the second container image to the second cloud network for creating a second container based upon the second container image.

In some embodiments, the overlay network can instantiate a second dedicated message bus interface on the message bus. The overlay network can provide, via the second dedicated message bus interface, the second container image to the second cloud network for creating the second container based upon the second container image.

In some embodiments, the overlay network can determine than an update is available for a container image. The overlay network can retrieve, via the message bus, the update for the container image from the containerized application asset repository. The overlay network can provide, via the dedicated message bus interface, the update to the second cloud network for applying the update to the container image. Similarly, in some embodiments, the overlay network can determine that a second update is available for the second container image. The overlay network can retrieve, via the message bus the second update for the second container image from the containerized application asset repository. The overlay network can provide, via the second dedicate message bus interface, the second updated to the second cloud network for applying the second update to the second container image.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
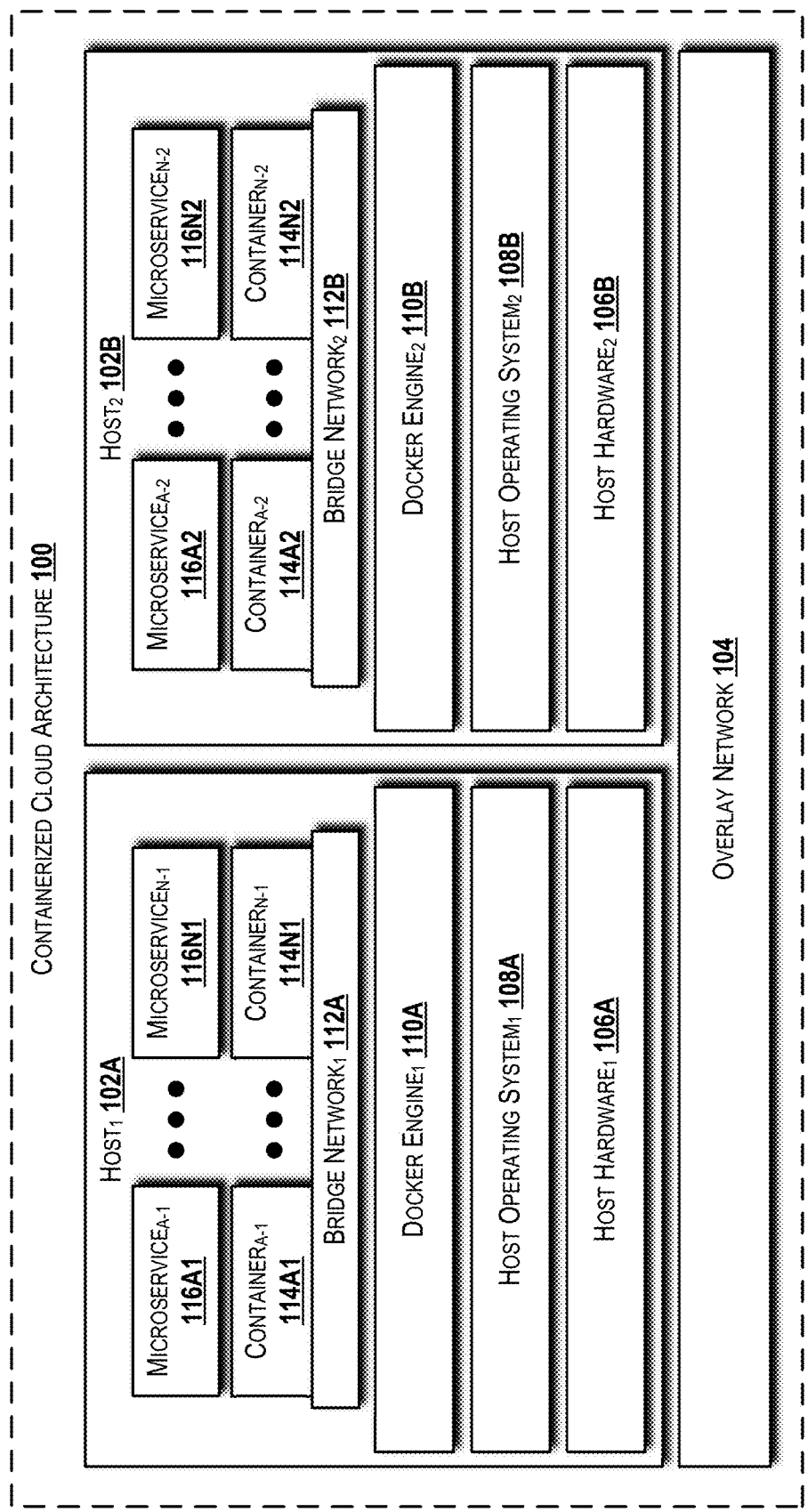
FIG. 1 is a block diagram illustrating an exemplary containerized cloud architecture capable of implementing, at least in part, aspects of the concepts and technologies disclosed herein, according to an illustrative embodiment.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for service correlation across hybrid cloud architecture to support container hybridization will be described.

Figure 2A:
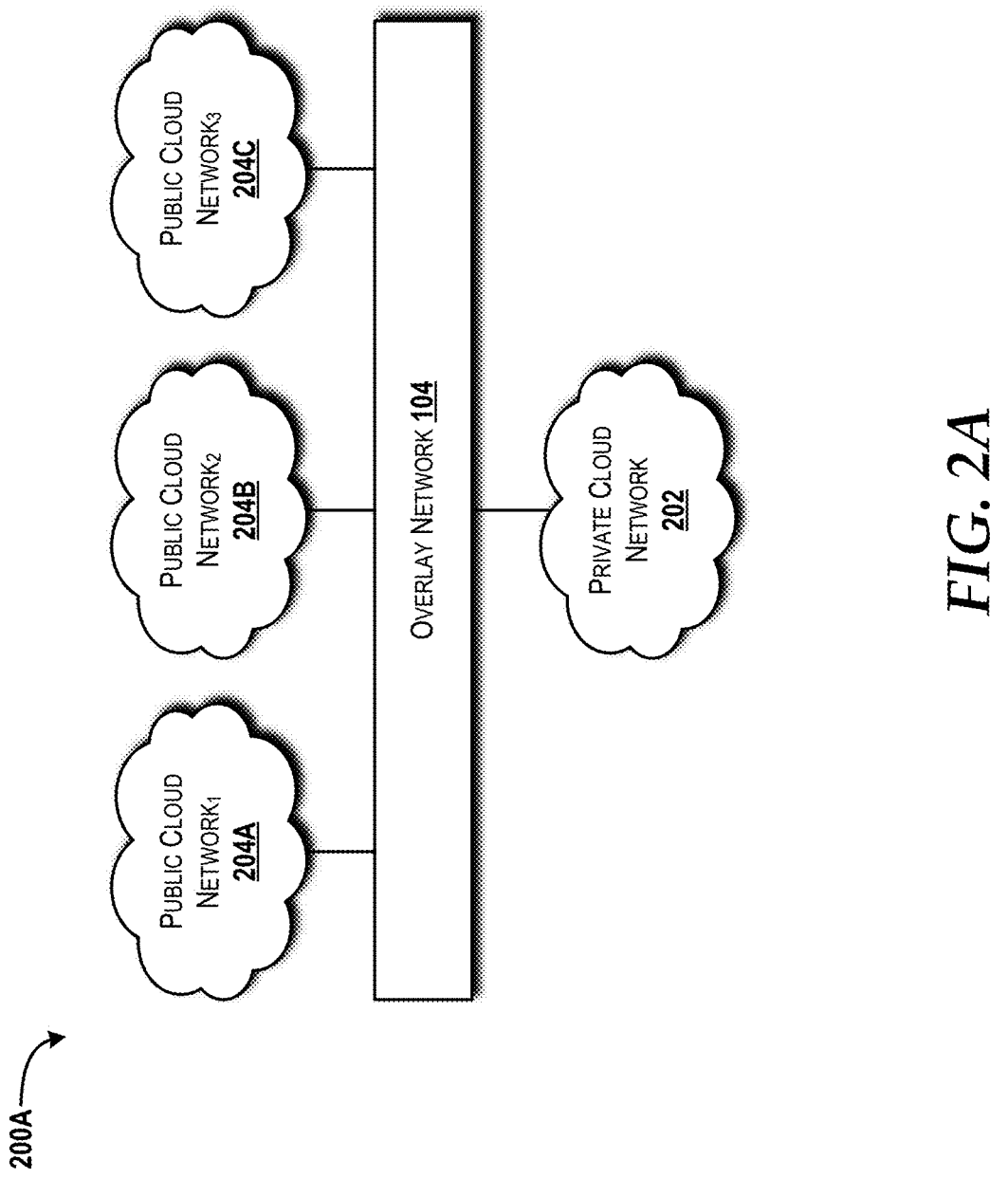
FIGS. 2A-2B are block diagrams illustrating exemplary configurations of public and private cloud networks, according to illustrative embodiments.
Figure 2B:
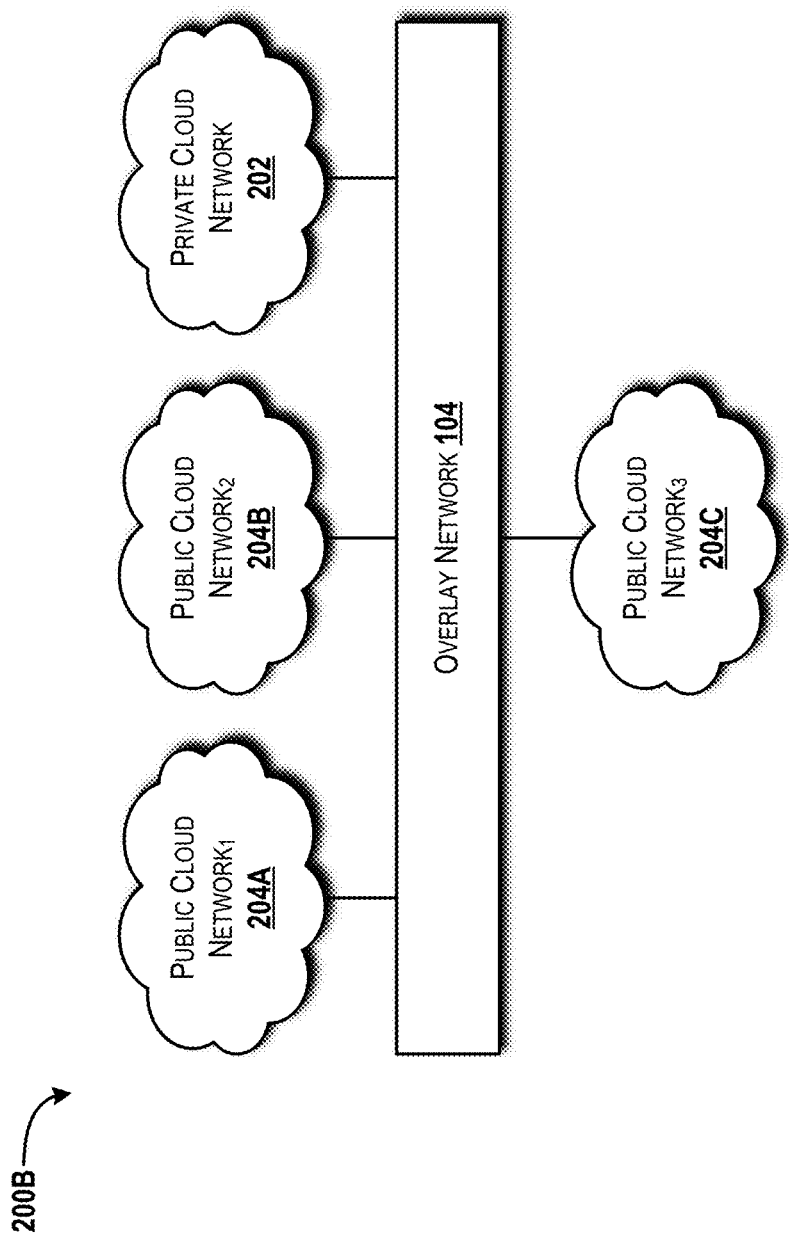

Turning now to FIG. 1, a block diagram illustrating an exemplary containerized cloud architecture 100 capable of implementing, at least in part, aspects of the concepts and technologies disclosed herein will be described, according to an illustrative embodiment. The illustrated containerized cloud architecture 100 includes a first host ("host$_1$") 102A and a second host ("host$_2$") 102B (at times referred to herein collectively as hosts 102 or individually as host 102) that can communicate via an overlay network 104. Although two hosts 102 are shown, the containerized cloud architecture 100 can support any number of hosts 102. The containerized cloud architecture 100 can be utilized by any number of cloud networks described herein, including, for example private cloud networks and public cloud networks as shown in FIGS. 2A and 2B. The overlay network 104 can enable communication among hosts 102 in the same cloud network (as shown in FIG. 1) or hosts 102 across different cloud networks (as shown in FIGS. 2A and 2B). Moreover, the overlay network 104 can enable communication among hosts 102 owned and/or operated by the same or different entities. Additional details about the overlay network 104 will be described herein with reference to FIG. 4.

The illustrated host$_1$ 102A includes a host hardware$_1$ 106A, a host operating system$_1$ 108A, a DOCKER engine$_1$ 110A, a bridge network$_1$ 112A, container$_{A-1}$ through container$_{N-1}$ 114A1-114N1, and microservice$_{A-1}$ through microservice$_{N-1}$ 116A1-116N1. Similarly, the illustrated host$_2$ 102B includes a host hardware$_2$ 106B, a host operating system$_2$ 108B, a DOCKER engine$_2$ 110B, a bridge network$_2$ 112B, container$_{A-2}$ through container$_{N-2}$ 114A2-114N2, and microservice$_{A-2}$ through microservice$_{N-2}$ 116A2-116N2.

The host hardware$_1$ 106A and the host hardware$_2$ 106B (at times referred to herein collectively or individually as host hardware 106) can be implemented as bare metal hardware such as one or more physical servers. The host hardware 106 alternatively can be implemented using hardware virtualization. In some embodiments, the host hardware 106 can include compute resources, memory resources, and other hardware resources. These resources can be virtualized according to known virtualization techniques. A virtualization cloud architecture 900 is described herein with reference to FIG. 9. Although the containerized cloud architecture 100 and the virtualization cloud architecture 900 are described separately, these architecture can be combined to provide a hybrid containerized/virtualized cloud architecture. Those skilled in the art will appreciate that the disclosed cloud architectures are simplified for ease of explanation and can be altered as needed for any given implementation without departing from the scope of the concepts and technologies disclosed herein. As such, the containerized cloud architecture 100 and the virtualized cloud architecture 900 should not be construed as being limiting in any way.

Compute resources can include one or more hardware components that perform computations to process data and/or to execute computer-executable instructions. For example, the compute resources can execute instructions of the host operating system$_1$ 108A and the host operating system$_2$ 108B (at times referred to herein collectively as host operating systems 108 or individually as host operating system 108), the containers 114A1-114N1 and the containers 114A2-114N2 (at times referred to herein collectively as containers 114 or individually as container 114), and the microservices 116A1-116N1 and the microservices 116A2-116N2 (at times referred to herein collectively as microservices 116 or individually as microservice 116).

The compute resources of the host hardware 106 can include one or more central processing units ("CPUs") configured with one or more processing cores. The compute resources can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources can include one or more discrete GPUs. In some other embodiments, the compute resources can include CPU and GPU components that are configured in accordance with a co-processing CPU/GPU computing model, wherein the sequential part of an application executes on the CPU and the computationally-intensive part is accelerated by the GPU. The compute resources can include one or more system-on-chip ("SoC") components along with one or more other components, including, for example, one or more memory resources, and/or one or more other resources. In some embodiments, the compute resources can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources can be or can include one or more hardware components architected in accordance with an advanced reduced instruction set computing ("RISC") ("ARM") architecture, available for license from ARM HOLDINGS. Alternatively, the compute resources can be or can include one or more hardware components architected in accordance with an x86 architecture, such an architecture available from INTEL CORPORATION, and others. Those skilled in the art will appreciate the implementation of the compute resources can utilize various computation architectures, and as such, the compute resources should not be construed as being limited to any particular computation architecture or combination of computation architectures, including those explicitly disclosed herein.

The memory resources of the host hardware 106 can include one or more hardware components that perform storage operations, including temporary or permanent storage operations. In some embodiments, the memory resource(s) include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources.

The other resource(s) of the host hardware 106 can include any other hardware resources that can be utilized by the compute resources(s) and/or the memory resource(s) to perform operations described herein. The other resource(s) can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The host operating systems 108 can be proprietary, open source, or closed source. In some embodiments, the host operating systems 108 can be or can include one or more container operating systems designed specifically to host containers such as the containers 114. For example, the host operating systems 108 can be or can include FEDORA COREOS (available from RED HAT, INC), RANCHEROS (available from RANCHER), and/or BOTTLEROCKET (available from Amazon Web Services). In some embodiments, the host operating systems 108 can be or can include one or more members of the WINDOWS family of operating systems from MICROSOFT CORPORATION (e.g., WINDOWS SERVER), the LINUX family of operating systems (e.g., CENTOS, DEBIAN, FEDORA, ORACLE LINUX, RHEL, SUSE, and UBUNTU), the SOLARIS family of operating systems from ORACLE CORPORATION, other operating systems, and the like.

The containerized cloud architecture 100 can be implemented utilizing any containerization technologies. Presently, open-source container technologies, such as those available from DOCKER, INC., are the most widely used, and it appears will continue to be for the foreseeable future. For this reason, the containerized cloud architecture 100 is described herein using DOCKER container technologies available from DOCKER, INC., such as the DOCKER engines 110. Those skilled in the art will appreciate that other container technologies may also be applicable to implementing the concepts and technologies disclosed herein, and as such, the containerized cloud architecture 100 is not limited to DOCKER container technologies. Moreover, although open-source container technologies are most widely used, the concepts and technologies disclosed here may be implemented using proprietary technologies or closed source technologies.

The DOCKER engines 110 are based on open source containerization technologies available from DOCKER, INC. The DOCKER engines 110 enable users (not shown) to build and containerize applications. The full breadth of functionality provided by the DOCKER engines 110 and associated components in the DOCKER architecture are beyond the scope of the present disclosure. As such, the primary functions of the DOCKER engines 110 will be described herein in brief, but this description should not be construed as limiting the functionality of the DOCKER engines 110 or any part of the associated DOCKER architecture. Instead, those skilled in the art will understand the implementation of the DOCKER engines 110 and other components of the DOCKER architecture to facilitate building and containerizing applications within the containerized cloud architecture 100.

The DOCKER engine 110 functions as a client-server application executed by the host operating system 108. The DOCKER engine 110 provides a server with a daemon process along with application programming interfaces ("APIs") that specify interfaces that applications can use to communicate with and instruct the daemon to perform operations. The DOCKER engine 110 also provides a command line interface ("CLI") that uses the APIs to control and interact with the daemon through scripting and/or CLI commands. The daemon can create and manage objects such as images, containers, networks, and volumes. Although a single DOCKER engine 110 is illustrated in each of the hosts 102, multiple DOCKER engines 110 are contemplated. The DOCKER engine(s) 110 can be run in swarm mode.

The bridge networks 112 enable the containers 114 connected to the same bridge network to communicate. For example, the bridge network$_1$ 112A enables communication among the containers 114A1-114N1, and the bridge network$_2$ 112B enables communication among the containers 114A2-114N2. In this manner, the bridge networks 112 isolate the containers 114A1-114N1 from the containers 114A2-114N2 to prevent direct communication. In some embodiments, the bridge networks 112 are software network bridges implemented via the DOCKER bridge driver. The DOCKER bridge driver enables default and user-defined network bridges.

Figure 3A:
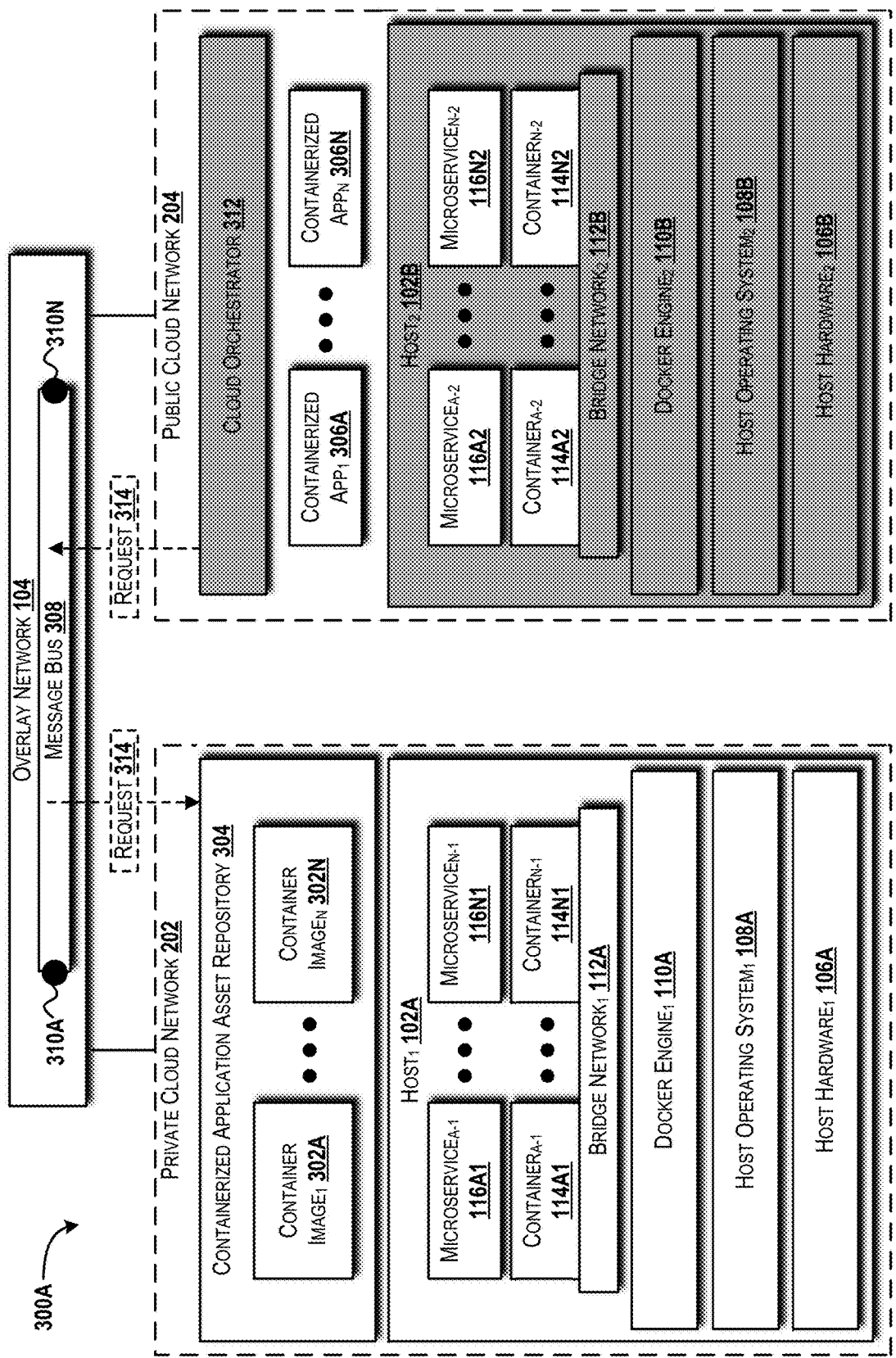
FIG. 3A is a block diagram illustrating details of an exemplary private cloud network to a public cloud network configuration to support container hybridization, according to an illustrative embodiment.
Figure 3B:
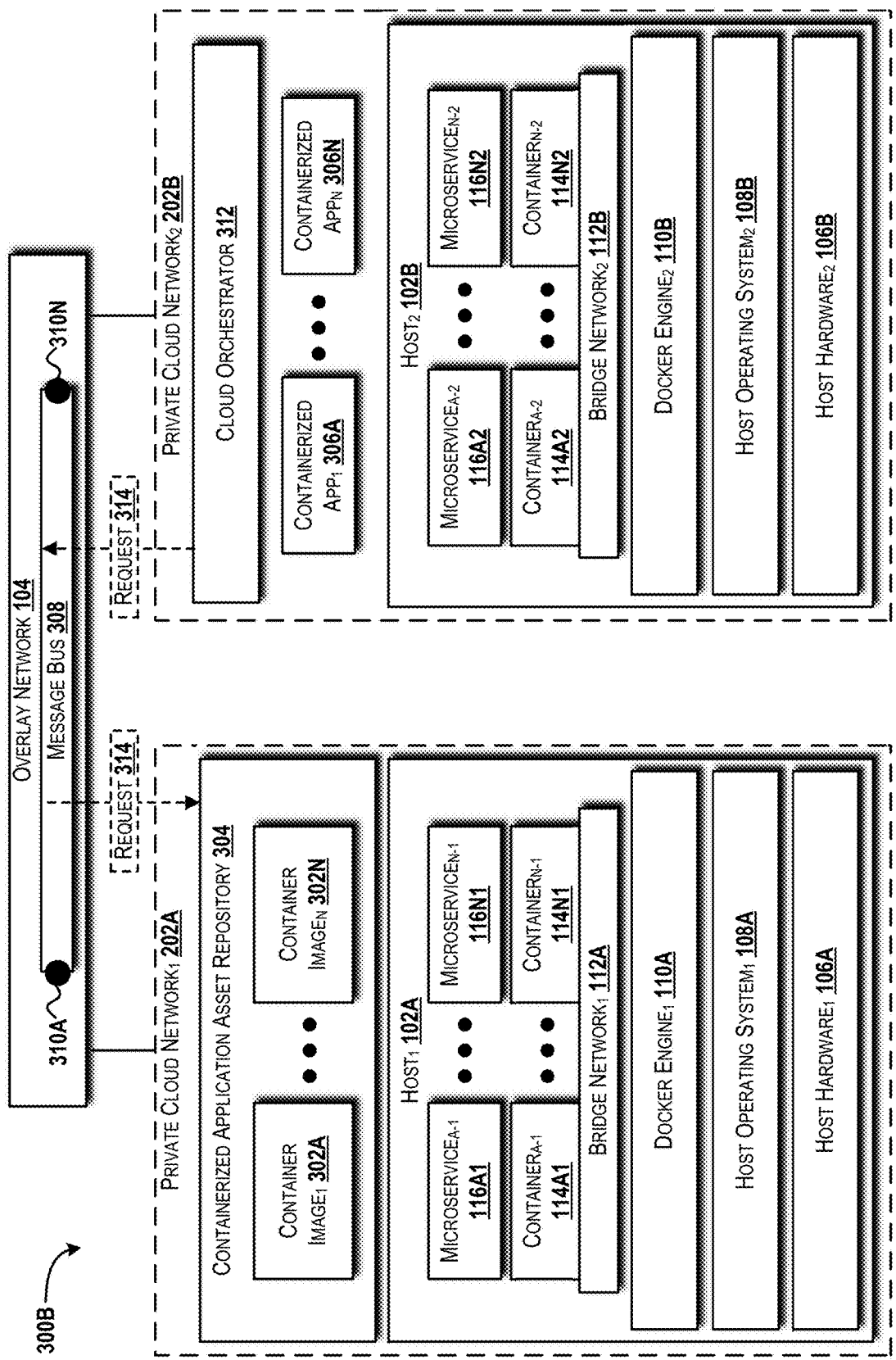
FIG. 3B is a block diagram illustrating details of an exemplary private cloud network to another private cloud network configuration to support container hybridization, according to an illustrative embodiment.

The containers 114 are runtime instances of images, such as container images 302A-302N (best shown in FIGS. 3A and 3B). The containers 114 are described herein specifically as DOCKER containers, although other containerization technologies are contemplated as noted above. Each container 114 can include an image, an execution environment, and a standard set of instructions.

The microservices 116 are applications that provide a single function. In some embodiments, each of the microservices 116 is provided by one of the containers 114, although each of the containers 114 may contain multiple microservices 116. For example, the microservices 116 can include, but are not limited to, server, database, and other executable applications to be run in an execution environment provided by a container 114. The microservices 116 can provide any type of functionality, and therefore all the possible functions cannot be listed herein. Those skilled in the art will appreciate the use of the microservices 116 along with the containers 114 to improve many aspects of the containerized cloud architecture 100, such as reliability, security, agility, and efficiency, for example.

Turning now to FIGS. 2A-2B, block diagrams illustrating exemplary configurations of public and private cloud networks will be described, according to illustrative embodiments. As used herein, a "private cloud network" is a cloud network that is provisioned for use by a select one or more users. In context of the concepts and technologies disclosed herein, the users can be one or more public cloud networks, such as illustrated in FIGS. 2A and 2B. As used herein, a "public cloud network" is a cloud network that is provisioned for public use (i.e., anyone who wants to use or purchase access). In accordance with the concepts and technologies disclosed herein, assets such as container images 302 (best shown in FIGS. 3A-3B) can be shared between a private cloud network 202 and one or more public cloud networks 204. In this manner, assets previously available by way of private cloud-only can be made available to a larger customer base that can access these assets through the public cloud network(s) 204. Another benefit of this hybrid cloud architecture is that more sensitive data/applications can be housed in the private cloud network 202. This can help minimize the security risk of using public cloud services. Another benefit of a hybrid cloud architecture is quickly deploying new applications in the public cloud networks 204, but keeping large, monolithic applications that are on legacy infrastructure in the private cloud network 202.

FIG. 2A illustrates a first configuration 200A in which a plurality of public cloud networks 204, illustrated as a public cloud network$_1$ 204A, a public cloud network$_2$ 204B, and a public cloud network$_3$ 204C, are mapped to a private cloud network 202 via the overlay network 104. FIG. 2B illustrates a second configuration 200B in which the public cloud network$_1$ 204A, the public cloud network$_2$ 204B, and the private cloud network 202 are mapped to the public cloud network$_3$ 204C. Although three public cloud networks 204 and one private cloud network 202 are illustrated, the overlay network 104 can support any number of public cloud networks 202 to enable communications with any number of private cloud networks 202. As such, the configurations 200A, 200B are merely exemplary and should not be construed as being limiting in any way.

Turning now to FIG. 3A, a block diagram illustrating details of an exemplary private cloud network 202 to public cloud network 204 configuration (shown as 300A) to support container hybridization in which containerized applications/services can be run on shared infrastructure will be described, according to an illustrative embodiment. Both the private cloud network 202 and the public cloud network 204 are implemented on the containerized cloud architecture 100 described herein above with reference to FIG. 1. In particular, the private cloud network 202 includes the host hardware$_1$ 106A, the host operating system$_1$ 108A, the DOCKER engine$_1$ 110A, the bridge network$_1$ 112A, the containers 114A1-114N1, and the microservices 116A1-116N1. Similarly, the public cloud network 204 includes the host hardware$_2$ 106B, the host operating system$_2$ 108B, the DOCKER engine$_2$ 110B, the bridge network$_2$ 112B, the containers 114A2-114N2, and the microservices 116A2-116N2. Although both the private cloud network 202 and the public cloud network 204 are illustrated with a single host (i.e., the host$_1$ 102A and the host$_2$ 102B, respectively), either or both the private cloud network 202 and the public cloud network 204 can include multiple hosts (not shown for ease of illustration).

The host hardware$_2$ 106B, the host operating system$_2$ 108B, the DOCKER engine$_2$ 110B, and the bridge network$_2$ 112B are all owned by the public cloud network 204 (as indicated in gray in FIG. 3A). The containers 114A2-114N2 in the host$_2$ 102B can be created by the docker engine$_2$ 110B based upon one or more container images 302A-302N (at times referred to herein collectively as container images 302 or individually as container image 302). The container images 302A-302N are owned by the private cloud network 202 and stored in a containerized application asset repository 304. As such, any containers and associated microservices, such as the containers 114A2-114N2 and the microservices 116A2-116N2, although hosted by the host$_2$ 102B, are based upon assets (i.e., one or more container images 302) owned by the private cloud network 202 (as indicated in white in FIG. 3A). In addition, the host$_2$ 102B can create one or more containerized applications 306A-306N (at times referred to herein collectively as containerized applications 306 or individually as containerized application 306). The containerized applications 306 can utilize, for example, multiple containers 114A2-114N2 and/or microservices 116A2-116N2. The containerized applications 306 also utilize assets owned by the private cloud network 202.

The container images 302 are packages that include all the information needed to create the containers 114. The container images 302 can include dependency information, such as dependencies on one or more frameworks, and deployment and execution confirmation information to be used by a container runtime. The container images 302 can be built from multiple base images that together form a filesystem for the resultant containers 114. The container images 302 may be static such that no changes can be made after creation.

The container images 302 can be used to create the containers 114A1-114N1 for use internally by the private cloud network 202. In addition, the container images 302 can be shared with the public cloud network 204 via the overlay network 104. In some embodiments, the containerized application asset repository 304 can be configured to store only the container images 302 to be shared with external cloud networks such as the public cloud network 204 in the illustrated example. In these embodiments, a private containerized application asset repository (not shown) can be implemented for use only by the private cloud network 202. Other embodiments may include an implementation of a permissions system whereby the container images 302 are associated with permission rules to establish whether a given container image can or cannot be shared with an external network such as the public cloud network 204. Those skilled in the art will appreciate other configurations that may be used based upon the implementation needs of a given deployment of the concepts and technologies disclosed herein. As such, the illustrated and other examples disclosed herein should not be construed as being limiting in any way.

The private cloud network 202 can provide access to the containerized application asset repository 304 through the overlay network 104 so that the public cloud network 204 can obtain one or more of the container images 302. The containerized application asset repository 304 can utilize a labeling system through which each of the container images 302 can be labeled with a tag to distinguish the container images 302 from each other. In some embodiments, the private cloud network 202 can publicize the container images 302 that are available from the containerized application asset repository 304. For example, a front-end (not shown) may be used by the private cloud network 202 to show external networks, such as the public cloud network 204, the container images 302 that are currently available. Other methods of publicizing available container images 302 are contemplated, and as such, the front-end example should not be construed as being limiting in any way.

In the illustrated example, the overlay network 104 is configured to instantiate a message bus 308 through which the private cloud network 202 and the public cloud network 204 can communicate with each other regarding the container images 302. The message bus 308 can provide an exclusive communication channel between cloud networks. In some embodiments, the overlay network 104 is a software-defined network ("SDN") controlled, at least in part, by the private cloud network 202. In these embodiments, the message bus 308 can be instantiated as an SDN element (best shown in FIG. 4).

The message bus 308 can be configured with one or more dedicated message bus interfaces 310A-310N (at times referred to herein collectively as dedicated message bus interfaces 310 or individually as dedicated message bus interface 310). The dedicated message bus interfaces 310 can provide a dedicated interface through which the private cloud network 202 and the public cloud network 204 can communicate with regard to specific container images 302. For example, the container image$_1$ 302A may be accessible via a first dedicated message bus interface 310A, and the container image$_2$ 302B may be accessible via a second dedicated message bus interface 310B. Each dedicated message bus interface 310 can be associated with the tag or other label used to uniquely identify the container image 302 that is accessible therethrough. The dedicated message bus interfaces 310 can be used to provide updates for the respective container images 302.

The public cloud network 204 can utilize a cloud orchestrator 312 to communicate with the private cloud network 202 via the message bus 308. The cloud orchestrator 312 can generate a request 314 for one or more of the container images 302 and send the request 314 to the private cloud network 202 that can retrieve the requested container image(s) 302 from the containerized application asset repository 304. The private cloud network 202 can respond to the request 314 with the requested container image(s) 302. The cloud orchestrator 312 can provide the requested container image(s) 302 to the docker engine$_2$ 110B for creating one or more containers 114.

Turning now to FIG. 3B, a block diagram illustrating details of an exemplary private cloud network to another private cloud network configuration (shown as 300B) to support container hybridization will be described, according to an illustrative embodiment. FIG. 3B is identical to FIG. 3A but for the implementation of the host$_2$ 102B on a second private cloud network 202B owned by the same entity.

Figure 4:
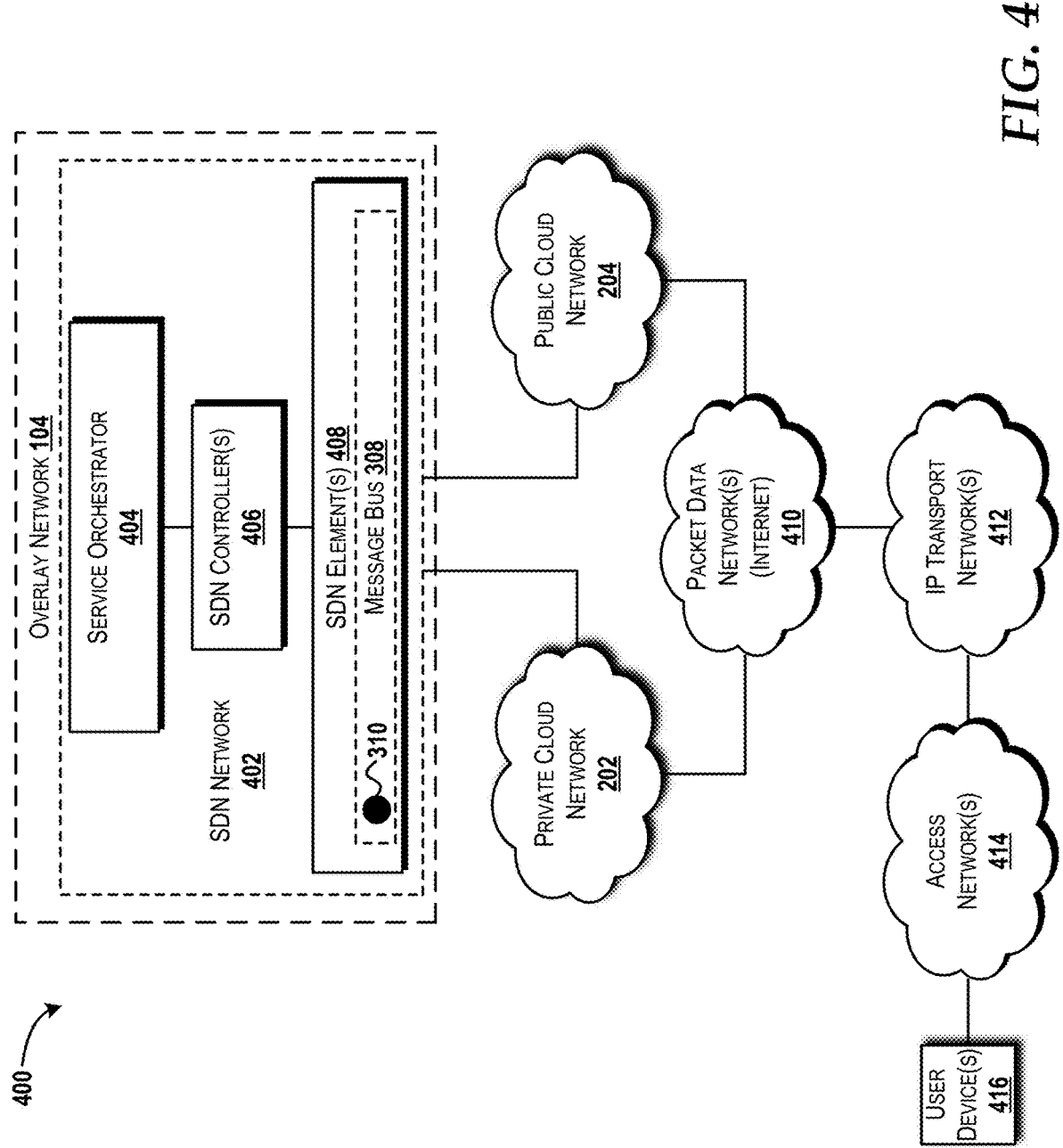
FIG. 4 is a block diagram illustrating an exemplary network communications overview, according to an illustrative embodiment.

Turning now to FIG. 4, a block diagram illustrating an exemplary network communications overview 400 will be described, according to an illustrative embodiment. The network communications overview 400 illustrates the overlay network 104 embodied as an SDN network 402. As used herein, "SDN" is an architectural framework for creating intelligent networks that are programmable, application-aware, and more open than traditional networks. In accordance with the concepts and technologies disclosed herein, SDN concepts can be utilized to provide the overlay network 104, and particularly, to instantiate the message bus 308 to enable communications between cloud networks, such as the private cloud network 202 and the public cloud network 204 in the illustrated example.

The SDN network 402 includes a service orchestrator 404 to orchestrate a message bus service to instantiate and maintain the message bus 308 at the request of the private cloud network 202. The service orchestrator 404 can include a computing system that includes one or more processors. The service orchestrator 404 can receive a service request from the private cloud network 202. In response to the service request, the service orchestrator 404 can coordinate instantiation of the message bus 308 to enable communications between the private cloud network 202 and the public cloud network 204 with regard to the container images 302 hosted by the private cloud network 202. The service orchestrator 404 can find and assign one or more of SDN controllers 406 to handle instantiation and/or management of the message bus 308. In some embodiments, the SDN controllers 406 can split responsibility between instantiation and management, although a single SDN controller 406 may be used for both responsibilities. For embodiments in which the message bus 308 utilizes one or more dedicated message bus interfaces 310, separate SDN controllers 406 can be assigned for instantiation and management thereof. In other embodiments, the overlay network 104 enables communications between the private cloud network 202 and any number of external cloud networks, such as a plurality of public cloud networks 204. In these embodiments, the service orchestrator 404 may assign an SDN controller 406 to each message bus 308 created between networks such that each cloud network relationship is independently controller by the SDN network 402.

The SDN network 402 also includes one or more SDN elements 408, including the message bus 308. Other SDN elements 408, such as switches, routers, hubs, repeaters, servers, gateways, other network elements, some combination thereof, and/or the like can be instantiated and managed by one or more SDN controllers 406 to provide the overlay network 104.

The overlay network 104 is shown being in communication with the private cloud network 202 and the public cloud network 204, such as in the example shown in FIG. 3A. The private cloud network 202 and the public cloud network 204 can each be in communication with one or more packet data networks 410, such as the Internet. The packet data network(s) 410 is/are in communication with one or more IP transport networks 412, which, in turn, are in communication with one or more access networks 414 that serve one or more user devices 416 such as computers, servers, smart phones, tablets, other computing devices, and the like.

The IP transport network(s) 412 can include any wireless/mobile IP network capable of transporting IP data transfer. The IP transport networks 412 can include one or more wireless core networks, such as, for example, an evolved packet core ("EPC") a circuit-switched core network ("CS CN"), a packet-switched core network ("PS CN"), an IP multimedia subsystem ("IMS") core network, multiples thereof, and/or combinations thereof. A wireless core network can utilize one or more mobile telecommunications technologies, such as, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies (e.g., 802.11 WI-FI), and the like. By way of example, and not limitation, the IP transport network(s) 412 can be or can include a Long-Term Evolution ("LTE") mobile wireless network. The IP transport networks 412 can additionally or alternatively include one or more wired/fixed IP networks capable of transporting IP data transfer.

The access networks 414 can include any IP access network that provides IP connectivity to the user devices 416 for access to the IP transport networks 412. In some embodiments, the access networks 414 can include one or more radio access networks ("RANs"). A RAN can utilize various channel access methods including, but not limited to, Time Division Multiple Access ("TDMA"), Frequency Division Multiple Access ("FDMA"), Single Carrier FDMA ("SC-FDMA"), Code Division Multiple Access ("CDMA"), wideband CDMA ("W-CDMA"), Orthogonal Frequency Division Multiplexing ("OFDM"), Space Division Multiple Access ("SDMA"), and/or the like to provide a radio/air interface to the user devices 416. Data communications can be provided in part by General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN, any combination thereof, and/or the like.

Figure 5:
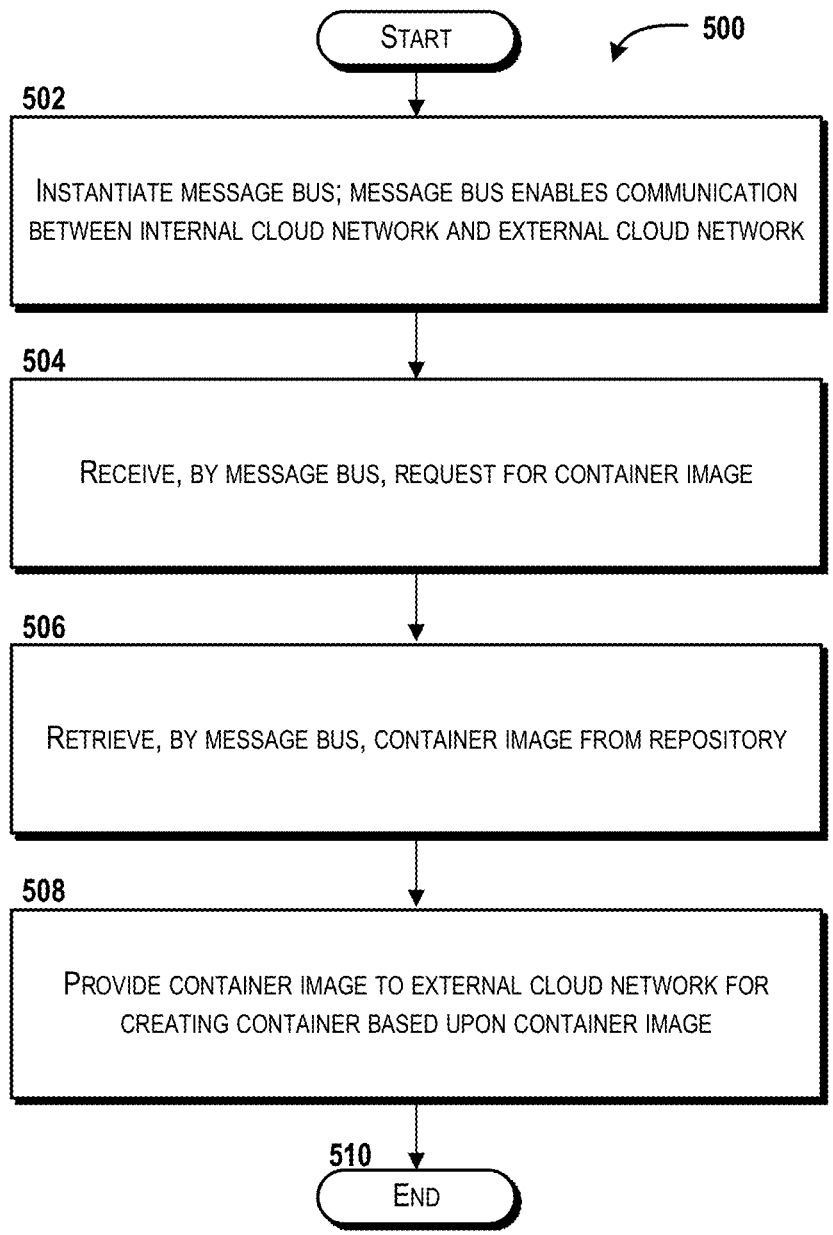
FIG. 5 is a flow diagram illustrating a method for providing a container image to an external cloud network, according to an illustrative embodiment.

Turning now to FIG. 5, aspects of a method 500 for providing a container image 302 to an external cloud network will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the following methods are described as being performed, at least in part, by one of the processors via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 500 will be described with additional reference to FIG. 3A in which the private cloud network 202 represents the internal cloud network and the public cloud network 204 represents the external cloud network in the following operations. The method 500 begins at operation 502. At operation 502, the overlay network 104 instantiates the message bus 308 between an internal cloud network and an external cloud network (hereinafter the private cloud network 202 and the public cloud network 204). The method 500 will be described in context of a single message bus 308 between the internal cloud network and the external cloud network. In some embodiments, the overlay network 104 can support multiple message busses 308, such as one for each public cloud network 204 in the example shown in FIG. 2A.

Figure 6:
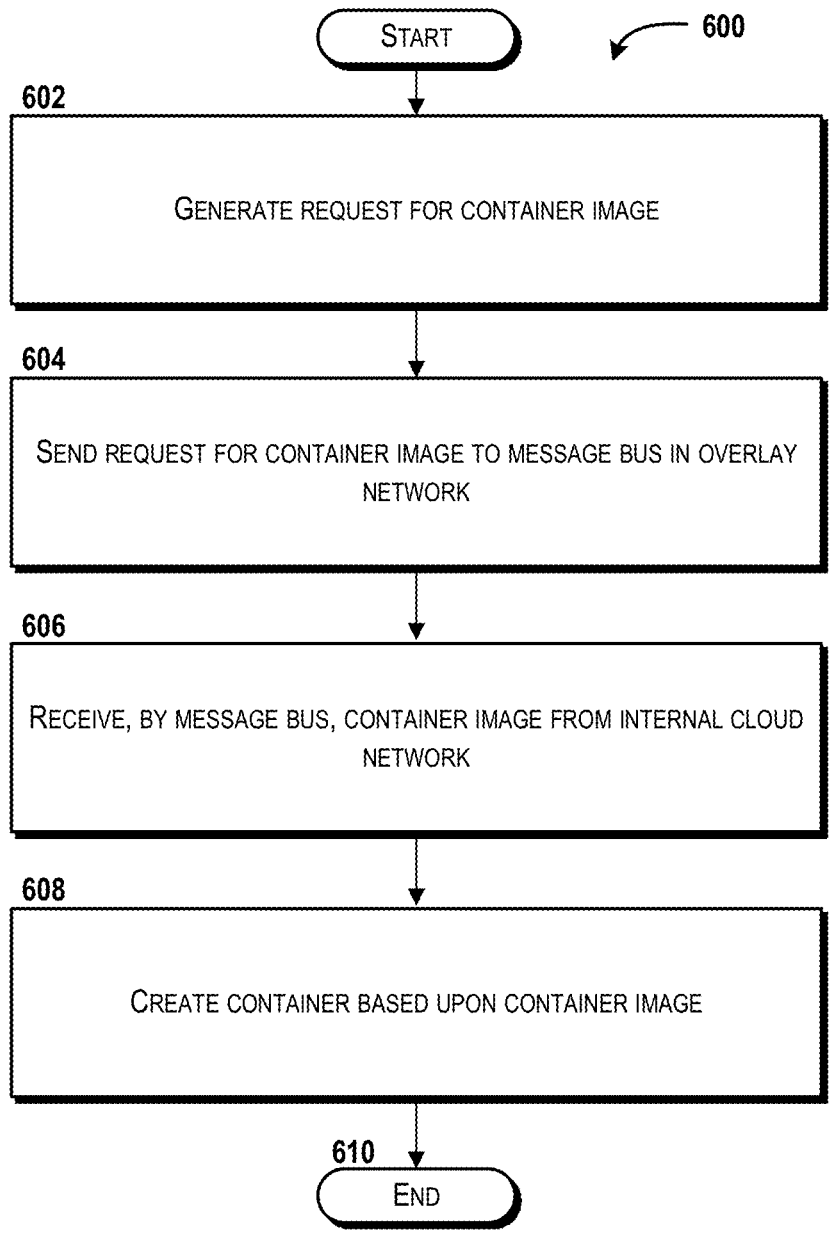
FIG. 6 is a flow diagram illustrating a method for orchestrating creation of a new container based upon a container image, according to an illustrative embodiment.

From operation 502, the method 500 proceeds to operation 504. At operation 504, the overlay network 104 receives, from the public cloud network 204, via the message bus 308, a request 314 for a container image 302. From operation 504, the method 500 proceeds to operation 506. At operation 506, the overlay network 104 retrieves, via the message bus 308, the requested container image 302 from the containerized application asset repository 304 of the private cloud network 202. From operation 506, the method 500 proceeds to operation 508. At operation 508, the overlay network 104 provides the container image 302 to the public cloud network 204 for creating a container 114 based upon the container image 302. The method 600 described below with reference to FIG. 6 provides additional details from the perspective of the cloud orchestrator 312 of the public cloud network 204. From operation 508, the method 500 proceed to operation 510. The method 500 can end at operation 510.

Turning now to FIG. 6, a method 600 for orchestrating creation of a new container 114 based upon a container image 302 will be described, according to an illustrative embodiment. The method 600 will be described with additional reference to FIG. 3A in which the private cloud network 202 represents the internal cloud network and the public cloud network 204 represents the external cloud network in the following operations.

The method 600 begins and proceeds to operation 602, where the cloud orchestrator 312 of the public cloud network 204 generates a request 314 for one or more of the container images 302 stored in the containerized application asset repository 304. From operation 602, the method 600 proceeds to operation 604. At operation 604, the cloud orchestrator 312 sends the request 314 for the container images(s) 302 to the message bus 308 in the overlay network 104. From operation 604, the method 600 proceeds to operation 606. At operation 606, the cloud orchestrator 312 receives, via the message bus 308, the container image 302 from the private cloud network 202. From operation 606, the method 600 proceeds to operation 608. At operation 608, the cloud orchestrator 312 creates one or more containers 114 based upon the container image(s) 302. From operation 608, the method 600 proceeds to operation 610. The method 600 can end at operation 610.

Figure 7:
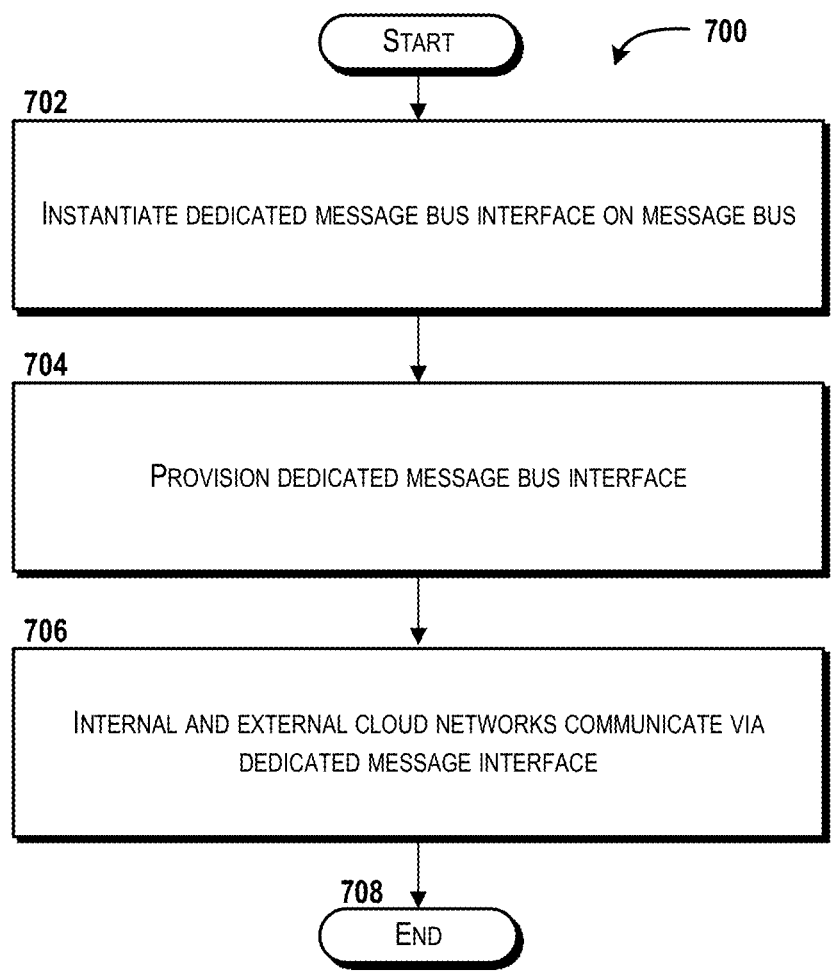
FIG. 7 is a flow diagram illustrating a method for instantiating and provisioning a dedicated message bus between cloud networks, according to an illustrative embodiment.

Turning now to FIG. 7, a method 700 for instantiating and provisioning a dedicated message bus interface 310 between cloud networks will be described, according to an illustrative embodiment. The method 700 will be described with additional reference to FIG. 3A in which the private cloud network 202 represents one cloud network and the public cloud network 204 represents another cloud network in the following operations.

The method 700 begins and proceeds to operation 702. At operation 702, the overlay network 104 instantiates a dedicated message bus interface 310 on the message bus 308. The overlay network 104 can instantiate the dedicated message bus interface 310 on a per cloud basis, such as one dedicated message bus interface 310 for each external cloud network. Turning briefly to FIG. 2A, for example, the overlay network 104 can instantiate a dedicated message bus interface 310 for each of the public cloud network$_1$ 204A, the public cloud network$_2$ 204B, and the public cloud network$_3$ 204C. Alternatively, the dedicated message bus interface 310 can be instantiated for each container image 302 provided to the public cloud network 204. Other configurations of the dedicated message bus interface 310 are contemplated.

From operation 702, the method 700 proceeds to operation 704. At operation 704, the overlay network 104 provisions the dedicated message bus interface 310 to enable communication between the private cloud network 202 and the public cloud network 204. From operation 704, the method 700 proceeds to operation 706. At operation 706, the private cloud network 202 and the public cloud network 204 communicate via the dedicated message bus interface 310. From operation 706, the method 700 proceeds to operation 708. At operation 708, the method 700 can end.

Figure 8:
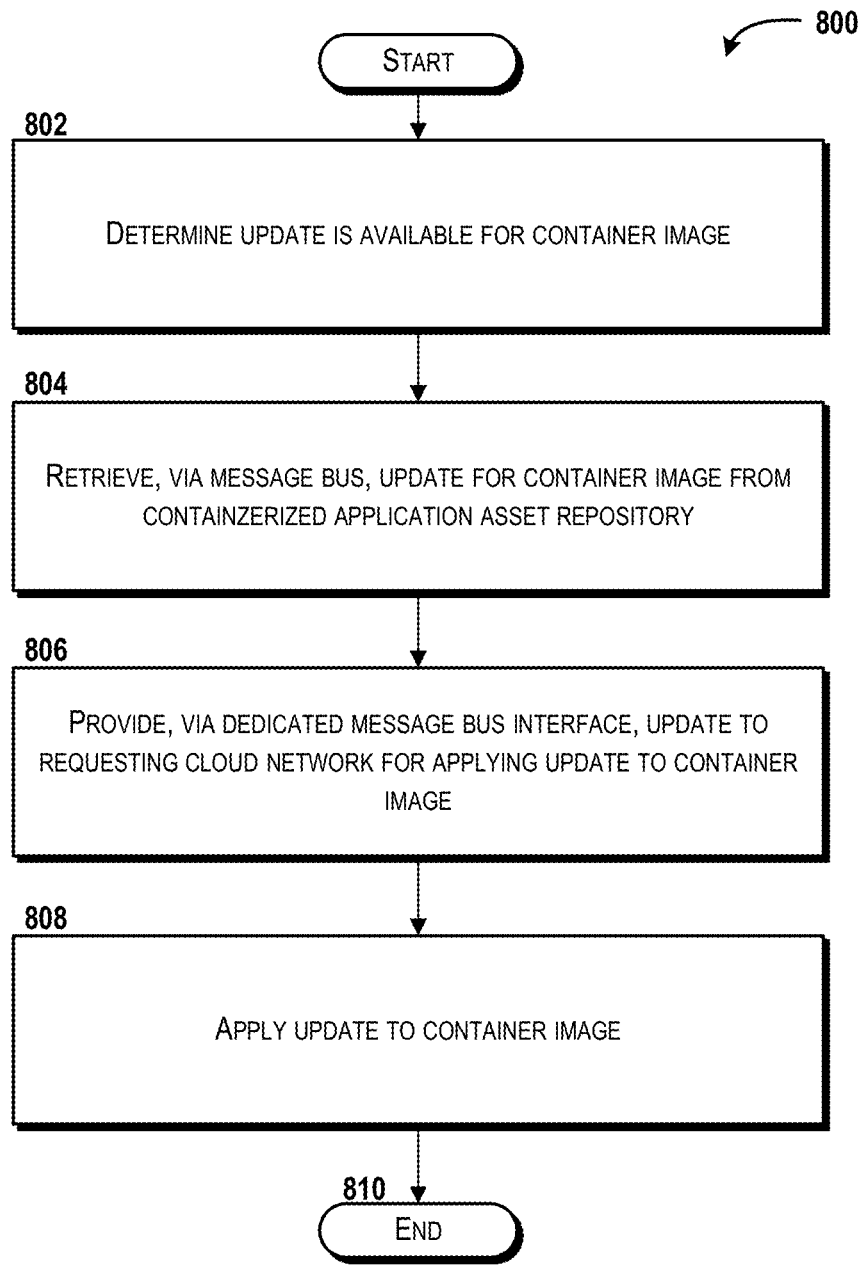
FIG. 8 is a flow diagram illustrating a method for updating a container image, according to an illustrative embodiment.

Turning now to FIG. 8, a method for updating a container image 302 will be described, according to an illustrative embodiment. The method 800 will be described with additional reference to FIG. 3A in which the private cloud network 202 represents the internal cloud network and the public cloud network 204 represents the external cloud network in the following operations.

The method 800 begins and proceeds to operation 802. At operation 802, the overlay network 104 determines that an update is available for a container image 302 that was previously provided to the private cloud network 202. In some embodiments, the overlay network 104 can determine that an update is available based upon a notification received from the private cloud network 202. In other embodiments, the overlay network 104 can query, on-demand or periodically, the containerized application asset repository 304 regarding whether any update is available for the container image 302. Alternatively, the cloud orchestrator 312 can query the containerized application asset repository 304 via the overlay network 104 to determine whether any update is available. Although the method 800 refers to a single container image 302, the operations described herein are suitable for any number of container images 302. Moreover, determining that an update is available can be for a specific container image 302, for any container image 302 previously requested by the cloud orchestrator 312, or for all container images 306 available to the cloud orchestrator 312.

From operation 802, the method 800 proceeds to operation 804. At operation 804, the overlay network 104 retrieves, via the message bus 308, an update for the container image 302 from the containerized application asset repository 304. From operation 804, the method proceeds to operation 806. At operation 806, the overlay network 104 provides, via the dedicated message bus interface 310, the update to the public cloud network 204 for applying the update to the container image 302. From operation 806, the method 800 proceeds to operation 808. At operation 808, the cloud orchestrator 312 can apply the update to the container image 302.

From operation 808, the method 800 can proceed to operation 810. At operation 810, the method 800 can end. It should be understood that the method 800 can operate in perpetuity to ensure that the container image(s) 302 used by the public cloud network 204 are always up-to-date. Moreover, the use of a dedicated message bus interface 310 for each container image 302 is one implementation of the update process described in FIG. 8. Alternatively, no dedicated message bus interface 310 is used and all updates are served through the message bus 308.

Figure 9:
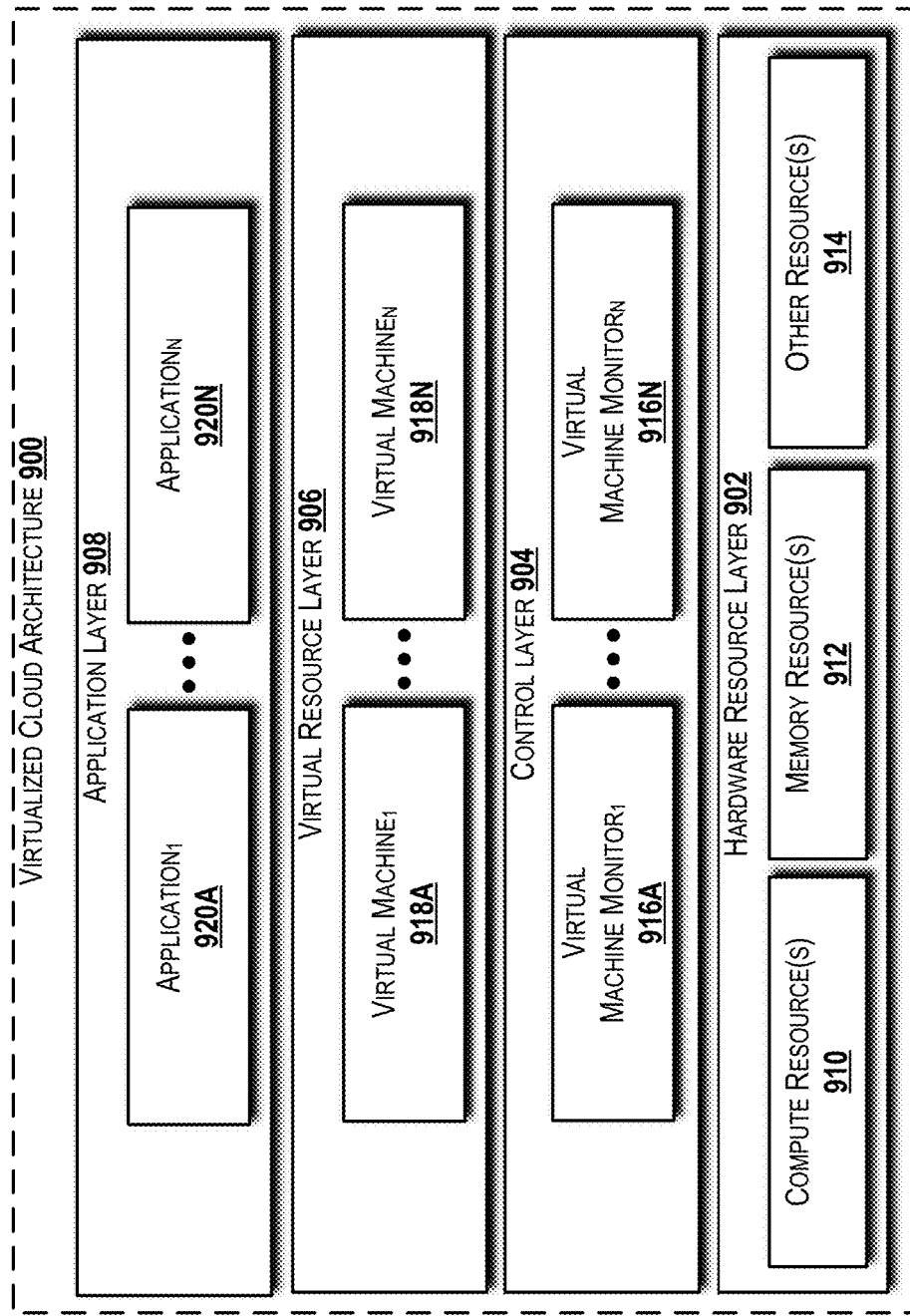
FIG. 9 is a block diagram illustrating an example virtualized cloud architecture and components thereof capable of implementing aspects of the embodiments presented herein.

Turning now to FIG. 9, a block diagram illustrating an example virtualized cloud architecture 900 and components thereof will be described, according to an exemplary embodiment. The virtualized cloud architecture 900 can be utilized to implement various elements disclosed herein. For example, the virtualized cloud architecture 900 can be utilized to virtualize components of the hosts 102, such as the virtualization of the host hardware 106. The virtualized cloud architecture 900 also can be utilized to virtualize components of the SDN network 402, including the service orchestrator 404, the SDN controller(s) 406, and/or the SDN element(s) 408 (including the message bus 308).

The virtualized cloud architecture 900 is a shared infrastructure that can support multiple services and network applications. The illustrated virtualized cloud architecture 900 includes a hardware resource layer 902, a control layer 904, a virtual resource layer 906, and an application layer 908 that work together to perform operations as will be described in detail herein.

The hardware resource layer 902 provides hardware resources, which, in the illustrated embodiment, include one or more compute resources 910, one or more memory resources 912, and one or more other resources 914. The compute resource(s) 910 can include one or more hardware components that perform computations to process data, and/or to execute computer-executable instructions of one or more application programs, operating systems, and/or other software. The compute resources 910 can include one or more central processing units ("CPUs") configured with one or more processing cores. The compute resources 910 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 910 can include one or more discrete GPUs. In some other embodiments, the compute resources 910 can include CPU and GPU components that are configured in accordance with a co-processing CPU/GPU computing model, wherein the sequential part of an application executes on the CPU and the computationally-intensive part is accelerated by the GPU. The compute resources 910 can include one or more system-on-chip ("SoC") components along with one or more other components, including, for example, one or more of the memory resources 912, and/or one or more of the other resources 914. In some embodiments, the compute resources 910 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 910 can be or can include one or more hardware components architected in accordance with an advanced reduced instruction set computing ("RISC") machine ("ARM") architecture, available for license from ARM HOLDINGS. Alternatively, the compute resources 910 can be or can include one or more hardware components architected in accordance with an x86 architecture, such an architecture available from INTEL CORPORATION of Mountain View, Calif., and others. Those skilled in the art will appreciate the implementation of the compute resources 910 can utilize various computation architectures, and as such, the compute resources 910 should not be construed as being limited to any particular computation architecture or combination of computation architectures, including those explicitly disclosed herein.

The memory resource(s) 912 can include one or more hardware components that perform storage operations, including temporary or permanent storage operations. In some embodiments, the memory resource(s) 912 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 910.

The other resource(s) 914 can include any other hardware resources that can be utilized by the compute resources(s) 910 and/or the memory resource(s) 912 to perform operations described herein. The other resource(s) 914 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 902 can be virtualized by one or more virtual machine monitors ("VMMs") 916A-916N (also known as "hypervisors"; hereinafter "VMMs 916") operating within the control layer 904 to manage one or more virtual resources that reside in the virtual resource layer 906. The VMMs 916 can be or can include software, firmware, and/or hardware that alone or in combination with other software, firmware, and/or hardware, manages one or more virtual resources operating within the virtual resource layer 906.

The virtual resources operating within the virtual resource layer 906 can include abstractions of at least a portion of the compute resources 910, the memory resources 912, the other resources 914, or any combination thereof. These abstractions are referred to herein as virtual machines ("VMs"). In the illustrated embodiment, the virtual resource layer 906 includes VMs 918A-918N (hereinafter "VMs 918"). Each of the VMs 918 can execute one or more applications 920A-920N in the application layer 908.

Figure 10:
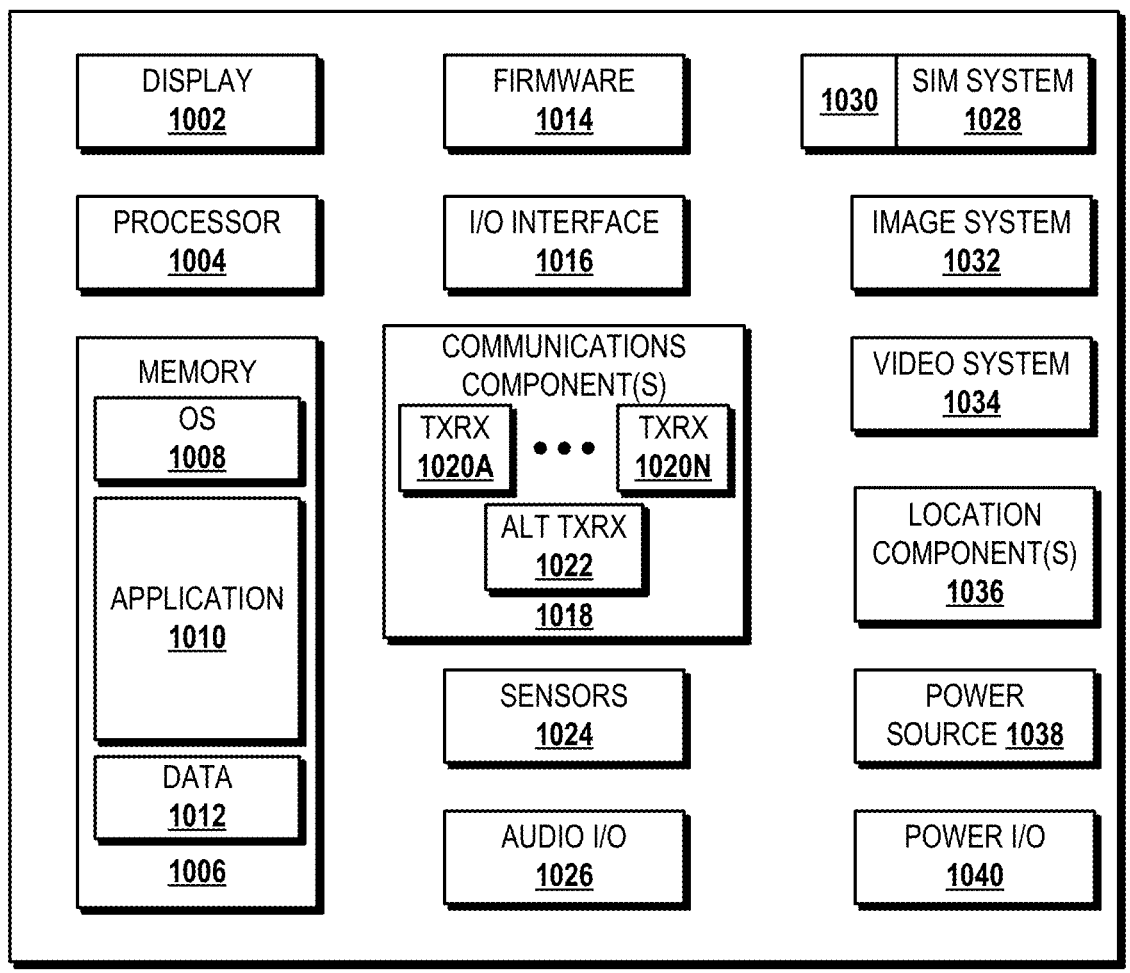
FIG. 10 is a block diagram illustrating an example mobile device and components thereof capable of implementing aspects of the embodiments presented herein.

Turning now to FIG. 10, an illustrative mobile device 1000 and components thereof will be described. In some embodiments, one or more of the user devices 416 can be configured like the mobile device 1000. While connections are not shown between the various components illustrated in FIG. 10, it should be understood that some, none, or all of the components illustrated in FIG. 10 can be configured to interact with one other to carry out various device functions. In some embodiments, the components are arranged so as to communicate via one or more busses (not shown). Thus, it should be understood that FIG. 10 and the following description are intended to provide a general understanding of a suitable environment in which various aspects of embodiments can be implemented, and should not be construed as being limiting in any way.

As illustrated in FIG. 10, the mobile device 1000 can include a display 1002 for displaying data. According to various embodiments, the display 1002 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 1000 also can include a processor 1004 and a memory or other data storage device ("memory") 1006. The processor 1004 can be configured to process data and/or can execute computer-executable instructions stored in the memory 1006. The computer-executable instructions executed by the processor 1004 can include, for example, an operating system 1008, one or more applications 1010, other computer-executable instructions stored in a memory 1006, or the like. In some embodiments, the applications 1010 also can include a user interface ("UI") application (not illustrated in FIG. 10).

The UI application can interface with the operating system 1008 to facilitate user interaction with functionality and/or data stored at the mobile device 1000 and/or stored elsewhere. In some embodiments, the operating system 1008 can include a member of the SYMBIAN OS family of operating systems from SYMBIAN LIMITED, a member of the WINDOWS MOBILE OS and/or WINDOWS PHONE OS families of operating systems from MICROSOFT COR- PORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1004 to aid a user in entering content, viewing account information, answering/initiating calls, entering/deleting data, entering and setting user IDs and passwords for device access, configuring settings, manipulating address book content and/or settings, multimode interaction, interacting with other applications 1010, and otherwise facilitating user interaction with the operating system 1008, the applications 1010, and/or other types or instances of data 1012 that can be stored at the mobile device 1000.

According to various embodiments, the applications 1010 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like.

The applications 1010, the data 1012, and/or portions thereof can be stored in the memory 1006 and/or in a firmware 1014, and can be executed by the processor 1004. The firmware 1014 also can store code for execution during device power up and power down operations. It can be appreciated that the firmware 1014 can be stored in a volatile or non-volatile data storage device including, but not limited to, the memory 1006 and/or a portion thereof.

The mobile device 1000 also can include an input/output ("I/O") interface 10110. The I/O interface 1016 can be configured to support the input/output of data such as location information, user information, organization information, presence status information, user IDs, passwords, and application initiation (start-up) requests. In some embodiments, the I/O interface 1016 can include a hardwire connection such as universal serial bus ("USB") port, a mini-USB port, a micro-USB port, an audio jack, a PS2 port, an Institute of Electrical and Electronics Engineers ("IEEE") 1394 ("FIREWIRE") port, a serial port, a parallel port, an Ethernet (RJ45) port, an RJ10 port, a proprietary port, combinations thereof, or the like. In some embodiments, the mobile device 1000 can be configured to synchronize with another device to transfer content to and/or from the mobile device 1000. In some embodiments, the mobile device 1000 can be configured to receive updates to one or more of the applications 1010 via the I/O interface 1016, though this is not necessarily the case. In some embodiments, the I/O interface 1016 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1016 may be used for communications between the mobile device 1000 and a network device or local device.

The mobile device 1000 also can include a communications component 1018. The communications component 1018 can be configured to interface with the processor 1004 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 1018 includes a multimode communications subsystem for facilitating communications via the cellular network and one or more other networks.

The communications component 1018, in some embodiments, includes one or more transceivers. The one or more transceivers, if included, can be configured to communicate over the same and/or different wireless technology standards with respect to one another. For example, in some embodiments one or more of the transceivers of the communications component 1018 may be configured to communicate using GSM, CDMA ONE, CDMA2000, LTE, and various other 2G, 2.5G, 3G, 4G, and greater generation technology standards. Moreover, the communications component 1018 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 1018 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 1018 can include a first transceiver ("TxRx") 1020A that can operate in a first communications mode (e.g., GSM). The communications component 1018 also can include an $N^{th}$ transceiver ("TxRx") 1020N that can operate in a second communications mode relative to the first transceiver 1020A (e.g., UMTS). While two transceivers 1020A-1020N (hereinafter collectively and/or generically referred to as "transceivers 1020") are shown in FIG. 10, it should be appreciated that less than two, two, and/or more than two transceivers 1020 can be included in the communications component 1018.

The communications component 1018 also can include an alternative transceiver ("Alt TxRx") 1022 for supporting other types and/or standards of communications. According to various contemplated embodiments, the alternative transceiver 1022 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 1018 also can facilitate reception from terrestrial radio networks, digital satellite radio networks, internet-based radio service networks, combinations thereof, and the like. The communications component 1018 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1000 also can include one or more sensors 1024. The sensors 1024 can include temperature sensors, light sensors, air quality sensors, movement sensors, orientation sensors, noise sensors, proximity sensors, or the like. As such, it should be understood that the sensors 1024 can include, but are not limited to, accelerometers, magnetometers, gyroscopes, infrared sensors, noise sensors, microphones, combinations thereof, or the like. Additionally, audio capabilities for the mobile device 1000 may be provided by an audio I/O component 1026. The audio I/O component 1026 of the mobile device 1000 can include one or more speakers for the output of audio signals, one or more microphones for the collection and/or input of audio signals, and/or other audio input and/or output devices.

The illustrated mobile device 1000 also can include a subscriber identity module ("SIM") system 1028. The SIM system 1028 can include a universal SIM ("USIM"), a universal integrated circuit card ("UICC") and/or other identity devices. The SIM system 1028 can include and/or can be connected to or inserted into an interface such as a slot interface 1030. In some embodiments, the slot interface 1030 can be configured to accept insertion of other identity cards or modules for accessing various types of networks. Additionally, or alternatively, the slot interface 1030 can be configured to accept multiple subscriber identity cards. Because other devices and/or modules for identifying users and/or the mobile device 1000 are contemplated, it should be understood that these embodiments are illustrative, and should not be construed as being limiting in any way.

The mobile device 1000 also can include an image capture and processing system 1032 ("image system"). The image system 1032 can be configured to capture or otherwise obtain photos, videos, and/or other visual information. As such, the image system 1032 can include cameras, lenses, charge-coupled devices ("CCDs"), combinations thereof, or the like. The mobile device 1000 may also include a video system 1034. The video system 1034 can be configured to capture, process, record, modify, and/or store video content. Photos and videos obtained using the image system 1032 and the video system 1034, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 1000 also can include one or more location components 1036. The location components 1036 can be configured to send and/or receive signals to determine a geographic location of the mobile device 1000. According to various embodiments, the location components 1036 can send and/or receive signals from global positioning system ("GPS") devices, assisted GPS ("A-GPS") devices, WI-FI/WIMAX and/or cellular network triangulation data, combinations thereof, and the like. The location component 1036 also can be configured to communicate with the communications component 1018 to retrieve triangulation data for determining a location of the mobile device 1000. In some embodiments, the location component 1036 can interface with cellular network nodes, telephone lines, satellites, location transmitters and/or beacons, wireless network transmitters and receivers, combinations thereof, and the like. In some embodiments, the location component 1036 can include and/or can communicate with one or more of the sensors 1024 such as a compass, an accelerometer, and/or a gyroscope to determine the orientation of the mobile device 1000. Using the location component 1036, the mobile device 1000 can generate and/or receive data to identify its geographic location, or to transmit data used by other devices to determine the location of the mobile device 1000. The location component 1036 may include multiple components for determining the location and/or orientation of the mobile device 1000.

The illustrated mobile device 1000 also can include a power source 1038. The power source 1038 can include one or more batteries, power supplies, power cells, and/or other power subsystems including alternating current ("AC") and/or direct current ("DC") power devices. The power source 1038 also can interface with an external power system or charging equipment via a power I/O component 1040. Because the mobile device 1000 can include additional and/or alternative components, the above embodiment should be understood as being illustrative of one possible operating environment for various embodiments of the concepts and technologies described herein. The described embodiment of the mobile device 1000 is illustrative, and should not be construed as being limiting in any way.

Figure 11:
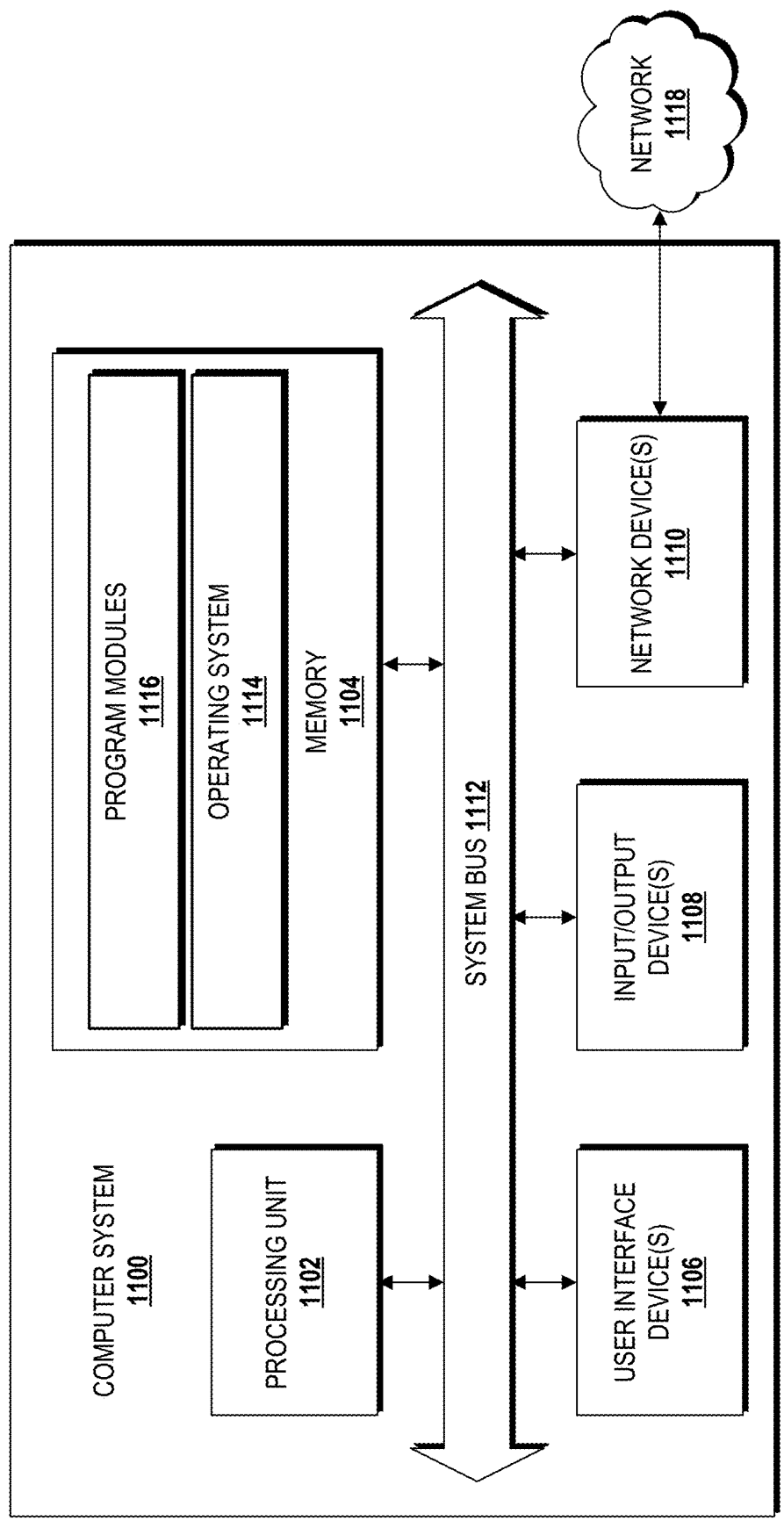
FIG. 11 is a block diagram illustrating an example computer system and components thereof capable of implementing aspects of the embodiments presented herein.

Turning now to FIG. 11 is a block diagram illustrating a computer system 1100 configured to provide the functionality in accordance with various embodiments of the concepts and technologies disclosed herein. The systems, devices, and other components disclosed herein can utilize, at least in part, an architecture that is the same as or at least similar to the architecture of the computer system 1100. For example, the host hardware 106, the user device(s) 416, the service orchestrator 404, the SDN controller(s) 406, the SDN element(s) 408, the message bus 308, or some combination thereof can utilize, at least in part, an architecture that is the same as or at least similar to the architecture of the computer system 1100. It should be understood, however, that modification to the architecture may be made to facilitate certain interactions among elements described herein.

The computer system 1100 includes a processing unit 1102, a memory 1104, one or more user interface devices 1106, one or more I/O devices 1108, and one or more network devices 1110, each of which is operatively connected to a system bus 1112. The bus 1112 enables bi-directional communication between the processing unit 1102, the memory 1104, the user interface devices 1106, the I/O devices 1108, and the network devices 1110.

The processing unit 1102 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 1104 communicates with the processing unit 1102 via the system bus 1112. In some embodiments, the memory 1104 is operatively connected to a memory controller (not shown) that enables communication with the processing unit 1102 via the system bus 1112. The illustrated memory 1104 includes an operating system 1114 and one or more program modules 1116. The operating system 1114 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 1116 may include various software and/or program modules to perform the various operations described herein. The program modules 1116 and/or other programs can be embodied in computer-readable media containing instructions that, when executed by the processing unit 1102, perform various operations such as those described herein. According to embodiments, the program modules 1116 may be embodied in hardware, software, firmware, or any combination thereof.

By way of example, and not limitation, computer-readable media may include any available computer storage media or communication media that can be accessed by the computer system 1100. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1100. In the claims, the phrase "computer storage medium," "computer-readable storage medium," and variations thereof does not include waves or signals per se and/or communication media, and therefore should be construed as being directed to "non-transitory" media only.

The user interface devices 1106 may include one or more devices with which a user accesses the computer system 1100. The user interface devices 1106 may include, but are not limited to, computers, servers, personal digital assistant ("PDAs"), cellular phones, or any suitable computing devices. The I/O devices 1108 enable a user to interface with the program modules 1116. In one embodiment, the I/O devices 1108 are operatively connected to an I/O controller (not shown) that enables communication with the processing unit 1102 via the system bus 1112. The I/O devices 1108 may include one or more input devices, such as, but not limited to, a keyboard, a mouse, or an electronic stylus. Further, the I/O devices 1108 may include one or more output devices, such as, but not limited to, a display screen or a printer. In some embodiments, the I/O devices 1108 can be used for manual controls for operations to exercise under certain emergency situations.

The network devices 1110 enable the computer system 1100 to communicate with other networks or remote systems via a network 1118. Examples of the network devices 1110 include, but are not limited to, a modem, a radio frequency ("RF") or infrared ("IR") transceiver, a telephonic interface, a bridge, a router, or a network card. The network 1118 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1118 may be or may include a wired network such as, but not limited to, a Wide Area Network ("WAN"), a wired Personal Area Network ("PAN"), or a wired Metropolitan Area Network ("MAN"). The network 1118 can be or can include any other network or combination of networks described herein.

Figure 12:
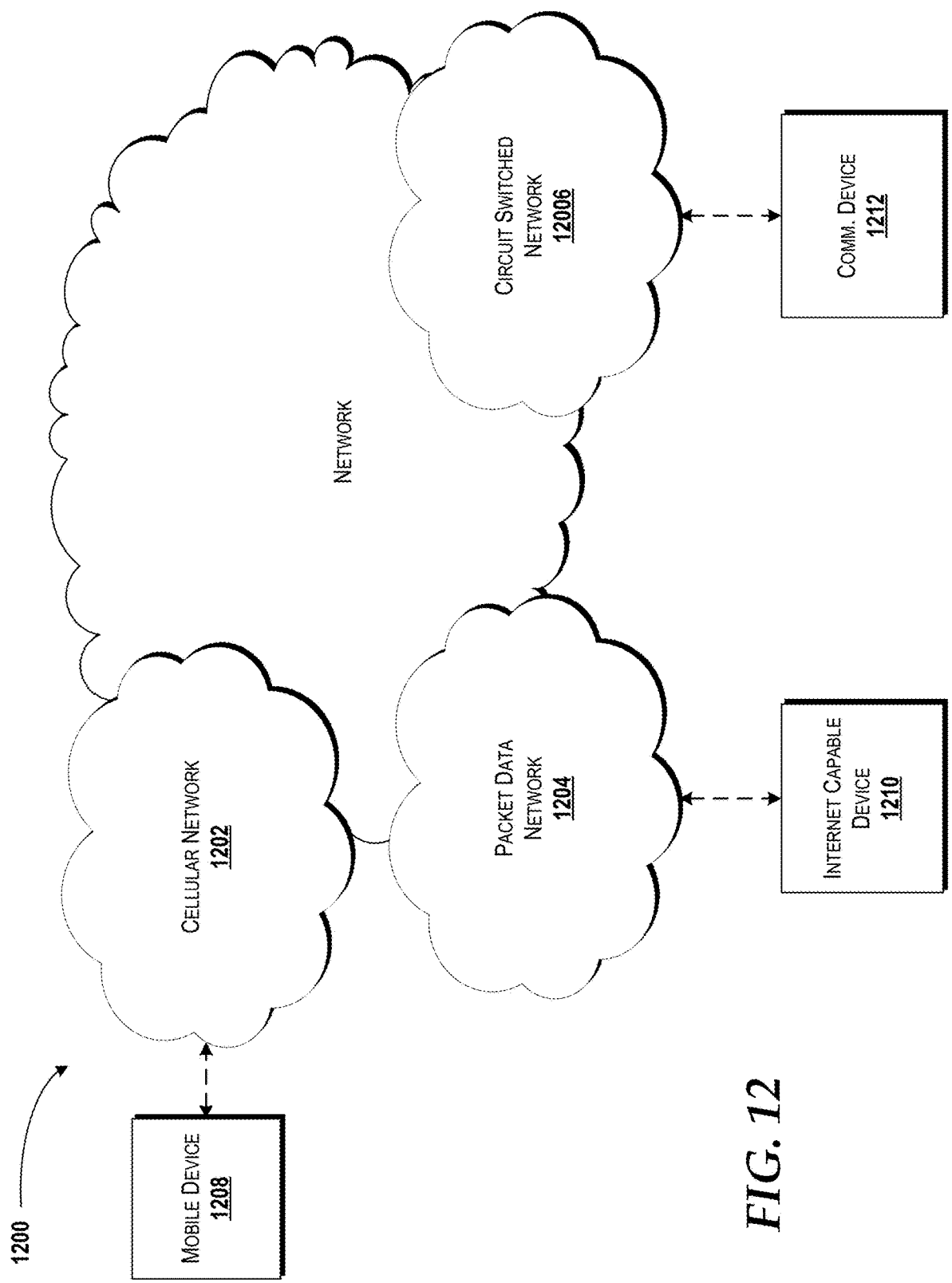
FIG. 12 is a block diagram illustrating an example network capable of implementing aspects of the embodiments presented herein.

Turning now to FIG. 12, a block diagram illustrating an example network 1200 capable of implementing aspects of the embodiments presented herein will be described, according to an illustrative example. The network 1200 includes a cellular network 1202, a packet data network 1204, for example, the Internet, and a circuit switched network 1206, for example, a publicly switched telephone network ("PSTN").

The cellular network 1202 includes various components such as, but not limited to, base transceiver stations ("BTSs"), NBs, eNBs, base station controllers ("BSCs"), radio network controllers ("RNCs"), mobile switching centers ("MSCs"), mobility management entities ("MMEs"), serving gateways ("SGWs"), packet gateway ("PGWs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1202 also includes radios and nodes for receiving and transmitting voice, data, and combinations thereof to and from radio transceivers, networks, the packet data network 1204, and the circuit switched network 1206.

A mobile communications device 1208, such as, for example, the user device 416, a cellular telephone, a user equipment, a mobile terminal, a PDA, a laptop computer, a handheld computer, and combinations thereof, can be operatively connected to the cellular network 1202. The cellular network 1202 can be configured as a 2G GSM network and can provide data communications via GPRS and/or EDGE. Additionally, or alternatively, the cellular network 1202 can be configured as a 3G UMTS network and can provide data communications via the HSPA protocol family, for example, HSDPA, EUL (also referred to as HSUPA), and HSPA+. The cellular network 1202 also is compatible with 4G mobile communications standards as well as evolved and future mobile standards.

The packet data network 1204 includes various devices, for example, servers, computers, databases, and other devices in communication with another, as is generally known. The packet data network 1204 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1204 includes or is in communication with the Internet. The circuit switched network 1206 includes various hardware and software for providing circuit switched communications. The circuit switched network 1206 may include, or may be, what is often referred to as a plain old telephone system (POTS). The functionality of a circuit switched network 1206 or other circuit-switched network are generally known and will not be described herein in detail.

The illustrated cellular network 1202 is shown in communication with the packet data network 1204 and a circuit switched network 1206, though it should be appreciated that this is not necessarily the case. One or more Internet-capable devices 1210, for example, a PC, a laptop, a portable device, or another suitable device, can communicate with one or more cellular networks 1202, and devices connected thereto, through the packet data network 1204. It also should be appreciated that the Internet-capable device 1210 can communicate with the packet data network 1204 through the circuit switched network 1206, the cellular network 1202, and/or via other networks (not illustrated).

As illustrated, a communications device 1212, for example, a telephone, facsimile machine, modem, computer, or the like, can be in communication with the circuit switched network 1206, and therethrough to the packet data network 1204 and/or the cellular network 1202. It should be appreciated that the communications device 1212 can be an Internet-capable device, and can be substantially similar to the Internet-capable device 1210. In the specification, the network 1200 is used to refer broadly to any combination of the networks 1202, 1204, 1206. It should be appreciated that substantially all of the functionality described with reference to the network 1200 can be performed by the cellular network 1202, the packet data network 1204, and/or the circuit switched network 1206, alone or in combination with other networks, network elements, and the like.

Based on the foregoing, it should be appreciated that concepts and technologies directed to service correlation across hybrid cloud architecture to support container hybridization have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. An overlay network comprising:
a software-defined network comprising a plurality of software-defined network elements and a software-defined network controller;
a compute resource; and
a memory resource that stores instructions that, when executed by the compute resource, cause the compute resource to perform operations comprising
instantiating a message bus between a first cloud network and a second cloud network, wherein instantiating the message bus comprises instantiating, by the software-defined network controller, the message bus as a software-defined network element of the plurality of software-defined network elements,
receiving, via the message bus, a request from the second cloud network for a container image stored in a containerized application asset repository of the first cloud network,
retrieving, via the message bus, the container image from the containerized application asset repository, and
providing, via the message bus, the container image to the second cloud network for creating a container based upon the container image.

2. The overlay network of claim 1, wherein the first cloud network comprises a private cloud network, and the second cloud network comprises a public cloud network; and wherein the private cloud network and the public cloud network are owned by different entities.

3. The overlay network of claim 1, wherein the first cloud network comprises a first private cloud network, and the second cloud network comprises a second private cloud network; and wherein the first private cloud network, and the second private cloud network are owned by a same entity.

4. The overlay network of claim 1, wherein the operations further comprise instantiating a dedicated message bus interface on the message bus; and wherein providing, via the message bus, the container image to the second cloud network for creating the container based upon the container image comprises providing, via the dedicated message bus interface, the container image to the second cloud network for creating the container based upon the container image.

5. The overlay network of claim 4, wherein the operations further comprise:
receiving, via the message bus, a second request from the second cloud network for a second container image;
retrieving, via the message bus, the second container image from the containerized application asset repository; and
providing, by the message bus, the second container image to the second cloud network for creating a second container based upon the second container image.

6. The overlay network of claim 5, wherein the operations further comprise instantiating a second dedicated message bus interface on the message bus; and wherein providing, via the message bus, the second container image to the second cloud network for creating the second container based upon the second container image comprises providing, by the second dedicated message bus interface, the second container image to the second cloud network for creating the second container based upon the second container image.

7. The overlay network of claim 6, wherein the operations further comprise:
determining that an update is available for the container image;
retrieving, via the message bus, the update for the container image from the containerized application asset repository; and
providing, via the dedicated message bus interface, the update to the second cloud network for applying the update to the container image.

8. The overlay network of claim 7, wherein the operations further comprise:
determining that a second update is available for the second container image;

retrieving, via the message bus, the second update for the second container image from the containerized application asset repository; and providing, via the second dedicated message bus interface, the second update to the second cloud network for applying the second update to the second container image.

9. A method comprising:

instantiating, by an overlay network implemented, at least in part, via a compute resource and a memory resource, a message bus between a first cloud network and a second cloud network, wherein the overlay network comprises a software-defined network comprising a plurality of software-defined network elements and a software-defined network controller, and wherein instantiating the message bus comprises instantiating, by the software-defined network controller, the message bus as a software-defined network element of the plurality of software-defined network elements;

receiving, by the overlay network, via the message bus, a request from the second cloud network for a container image stored in a containerized application asset repository of the first cloud network;

retrieving, by the overlay network, via the message bus, the container image from the containerized application asset repository; and providing, by the overlay network, via the message bus, the container image to the second cloud network for creating a container based upon the container image.

10. The method of claim 9, further comprising instantiating, by the overlay network, a dedicated message bus interface on the message bus; and wherein providing, by the overlay network, via the message bus, the container image to the second cloud network for creating the container based upon the container image comprises providing, by the overlay network, via the dedicated message bus interface, the container image to the second cloud network for creating the container based upon the container image.

11. The method of claim 10, further comprising:

receiving, via the message bus, a second request from the second cloud network for a second container image;

retrieving, via the message bus, the second container image from the containerized application asset repository; and providing, by the message bus, the second container image to the second cloud network for creating a second container based upon the second container image.

12. The method of claim 11, further comprising instantiating, by the overlay network, a second dedicated message bus interface on the message bus; and wherein providing, by the overlay network, via the message bus, the second container image to the second cloud network for creating the second container based upon the second container image comprises providing, by the second dedicated message bus interface, the second container image to the second cloud network for creating the second container based upon the second container image.

13. The method of claim 12, further comprising:

determining that an update is available for the container image;

retrieving, by the overlay network, via the message bus, the update for the container image from the containerized application asset repository; and providing, by the overlay network, via the dedicated message bus interface, the update to the second cloud network for applying the update to the container image.

14. The method of claim 13, further comprising:

determining that a second update is available for the second container image;

retrieving, by the overlay network, via the message bus, the second update for the second container image from the containerized application asset repository; and providing, by the overlay network, via the second dedicated message bus interface, the second update to the second cloud network for applying the second update to the second container image.

15. A computer-readable storage medium having instructions stored thereon that, when executed by a processor, cause the processor to perform operations comprising:

instantiating, via an overlay network, a message bus between a first cloud network and a second cloud network, wherein the overlay network comprises a software-defined network comprising a plurality of software-defined network elements and a software-defined network controller, and wherein instantiating the message bus comprises instantiating, by the software-defined network controller, the message bus as a software-defined network element of the plurality of software-defined network elements;

receiving, via the message bus, a request from the second cloud network for a container image stored in a containerized application asset repository of the first cloud network;

retrieving, via the message bus, the container image from the containerized application asset repository; and providing, via the message bus, the container image to the second cloud network for creating a container based upon the container image.

16. The computer-readable storage medium of claim 15, wherein the first cloud network comprises a private cloud network, and the second cloud network comprises a public cloud network; and wherein the private cloud network and the public cloud network are owned by different entities.

17. The computer-readable storage medium of claim 15, wherein the first cloud network comprises a first private cloud network, and the second cloud network comprises a second private cloud network; and wherein the first private cloud network, and the second private cloud network are owned by a same entity.

18. The computer-readable storage medium of claim 15, wherein the operations further comprise instantiating a dedicated message bus interface on the message bus; and wherein providing, via the message bus, the container image to the second cloud network for creating the container based upon the container image comprises providing, via the dedicated message bus interface, the container image to the second cloud network for creating the container based upon the container image.

* * * * *